Sept. 5, 1939.  P. CHAFFIN  2,171,844
TRACTION WHEEL
Filed Dec. 28, 1936
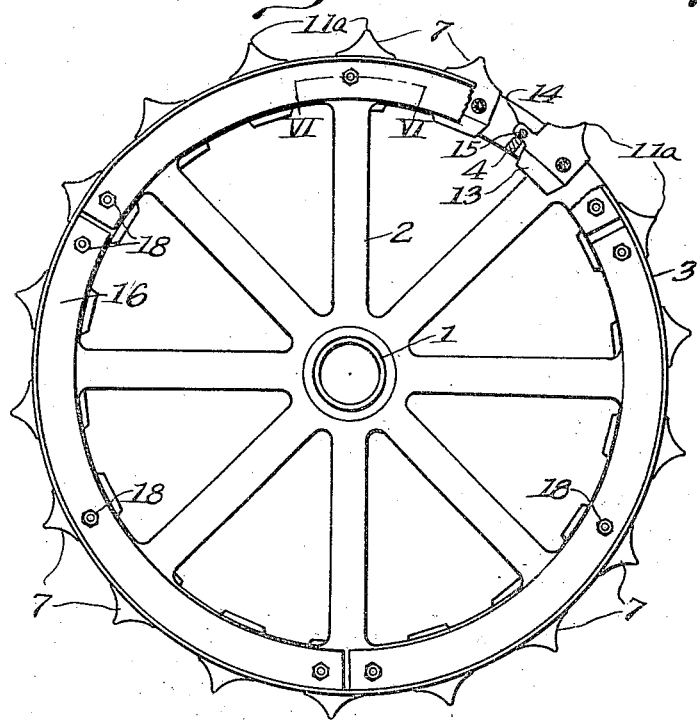
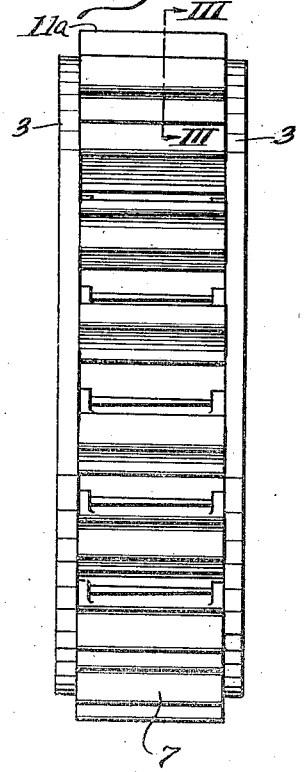
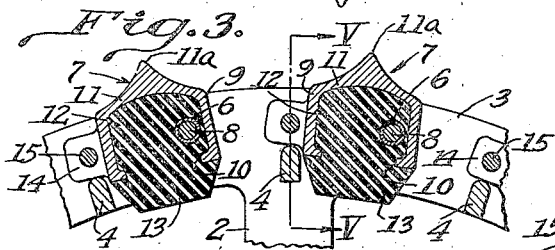
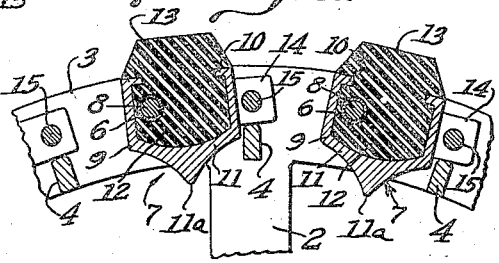
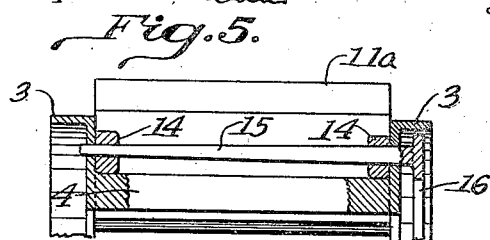
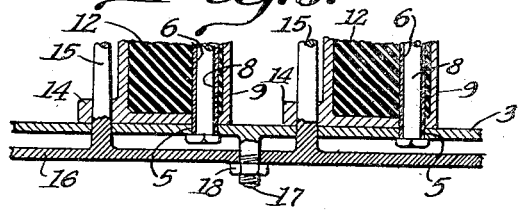
Inventor
Paul Chaffin
W. S. McHowell
Attorney Patented Sept. 5, 1939

2,171,844

UNITED STATES PATENT OFFICE 2,171,844

TRACTION WHEEL

Paul Chaffin, Washington Court House, Ohio, assignor of three-fourths to John H. Hoppes, Washington Court House, Ohio Application December 28, 1936, Serial No. 117,836

9 Claims. (Cl. 301—50)

This invention relates generally to traction devices and is particularly directed to a traction device to be provided upon the driving wheels of motor driven vehicles such as tractors, road making machines and similar apparatus.

Heretofore, devices of the character mentioned have been objectionable because, when used in wet clay or muddy fields, they would tend to pick up and pack clods of dirt around the cleats to such a degree that the cleats would not function and no grip on the ground could be secured. Also the cleats would dig into and mar hard surface roads in moving to and from the fields of operation.

It is an object of the present invention to provide a traction device which will be self cleaning and will not clog when used in soft clay or muddy ground.

It is also an object of the invention to provide a driving wheel for tractors or the like having traction lugs or cleats which can be reversed to present resilient pads to engage the surface when the vehicle is to be driven on hard surfaced roads.

A further object is the provision of a simple, efficient lock for holding the traction cleats in either of their adjusted positions.

A still further object rests in the formation of a traction wheel which will be easy to manufacture and one which will withstand hard usage without premature breakage.

Another object resides in furnishing a lock which will permit the cleats to be speedily reversed and will hold them rigid after they have been reversed.

With these and other objects in view, which will appear as the description proceeds, the invention consists in the novel features of construction and arrangement of parts as more particularly pointed out in the following description taken in connection with the accompanying drawing, wherein:

Fig. 1 is a side elevation of a tractor wheel provided with cleats formed in accordance with the present invention;

Fig. 2 is a front elevation of the wheel shown in Fig. 1;

Fig. 3 is a vertical sectional view on the plane indicated by the line III—III of Fig. 2 and shows the cleats positioned for use on unpaved surfaces;

Fig. 4 is a similar view with the cleats in position for use on a paved surface;

Fig. 5 is a vertical transverse sectional view on the plane indicated by the line V—V of Fig. 3, and Fig. 6 is a horizontal sectional view on the plane indicated by the line VI—VI of Fig. 1.

Referring more particularly to the drawing, the numeral 1 designates the wheel hub. This member may be formed to any desired shape to fit the particular vehicle axle to which the wheel is to be applied. Radiating from the hub 1 is a plurality of spokes 2 at the outer ends of which are formed a pair of spaced angular rim members 3. Circumferentially spaced, transversely extending bars 4 hold the rim members in their spaced positions. The work of these members may be augmented by any suitable bracing means arranged closer to the hub of the wheel.

The vertical webs of the rims 3 are provided at spaced intervals with openings 5 to receive the ends of sleeve members 6 which pass through and form a pivotal support for the cleats 7. Long tie bolts 8 extend through the sleeves 6 and hold them in place in the rims. The cleats are each of identical construction so that in case of breakage or other failure, the defective cleat may easily be replaced without affecting the balance of the wheel. Each cleat includes a hollow box-like body 9 preferably formed of cast steel or other equally tough alloy. The cleats extend from one rim to the other, sufficient clearance being allowed to provide for pivotal movement of the cleat on the sleeve. The body is closed on all sides except one and the edges around this open side are formed to include inwardly projecting flanges 10, the purpose of which will hereinafter be set forth. The side 11 of the body opposite the open side has integrally constructed therewith an outwardly projecting portion which terminates in a relatively sharp edge 11a. This side of the cleat as shown in Fig. 3, engages the earth when the cleat is used on unpaved surfaces.

The hollow body of the cleat receives a block of rubber 12 which projects through the open side and forms a resilient pad 13. When the cleats are positioned as shown in Fig. 4, the pads 13 engage the road. The cleats are used in this position when the vehicle is driven on paved surfaces. The rubber block 12 is vulcanized in place in the cleat body and the flanges 10, mentioned above, assist in holding the block in place in the cleat body.

The openings in the rubber block and the cleat body which receive the sleeve are arranged near one side of the body and the side opposite is provided with integrally formed, outwardly directed lugs 14. These lugs limit the pivotal movement of the cleat on the sleeve by engaging the transversely extending bars 4. The openings in the rim which receive the sleeves are arranged equidistantly from the adjacent bars 4 so that the lugs 14 will engage with a bar 4 at either end of pivotal movement of the cleat.

To hold the cleats in position with the lugs 14 in engagement with the bars 4, the lugs and the rims are provided with registering holes for the reception of tapering locking pins 15. A sectional clamping ring 16 is secured to the external side of the wheel and the pins 15 are welded or otherwise secured to the side of the ring 16. The latter member is divided into, in this instance, three arcuate sections, each of which are formed with openings to receive studs 17 provided on the rim on the outer side of the wheel. Nuts 18 threaded on the studs 17 hold the arcuate sections of the ring 16 in position with the pins 15 projecting through the holes provided therefore in the rims and cleat lugs. In the event one or more of the cleats should develop looseness, the nuts holding the clamping section could be tightened and the taper pins would again secure the loose cleat. The ring 16 is made sectional to facilitate the reversing of the cleats with a minimum amount of movement of the vehicle.

The outwardly projecting edge 11a on the cleats, connects with curved surfaces which flare outwardly to form a broad surface substantially in registration with the outwardly projecting flanges of the rims. This construction provides relatively sharp edges which easily penetrate the ground and yet the cleats will quickly pack the dirt to support the vehicle.

The spaces between the adjacent cleats are in open communication with the interior of the wheel and when the vehicle is driven in very soft mud or clay, the clods which are picked up will not pack between adjacent cleats but will work up into the space between the rims and fall out between the spokes. This enables the wheel to always present traction surface to the ground and the operator will not be required to dismount to clean the wheels in order to get traction.

While I have shown and described my invention in its preferred form, it will be understood that numerous minor changes may be made therein without departing from the spirit and scope of the invention as set forth in the appended claims.

What is claimed is:

1. A vehicle traction wheel comprising spaced rim members, circumferentially spaced transverse bars extending between and permanently united with said rim members, traction cleats pivotally supported on said rim members midway between said transverse bars, said cleats being provided on one face with a sharpened metallic projection and on the opposite face with a resilient pad, lug means extending from said cleats and engaging said bars, and lock means cooperating with said rims and lugs to hold said lugs in engagement with said bars.

2. A vehicle traction wheel comprising spaced rim members, circumferentially spaced transversely extending bars permanently secured to said rim members, sleeve members extending between said rim members at points midway between said transverse bars, traction cleats pivotally carried by said sleevs, said cleats being provided on one face with a sharpened projection and on the opposite face with a resilient pad, lug means extending from said cleats and engaging said bars, and tapered pins extending through said rims and said lugs to hold the latter in engagement with the former.

3. A traction wheel for vehicles comprising a pair of spaced rim members, circumferentially spaced bars extending between said rim members, a sleeve supported by said rim members midway between adjacent transverse bars, traction cleats each provided with an eccentrically arranged opening for the reception of said sleeves whereby said cleats will be pivotally supported thereby, lug means projecting from said cleats on the side opposite said eccentrically arranged opening, said lugs engaging said transverse bars to limit the pivotal movement of said cleats, taper pin means projecting through said rims and lugs, and a sectional ring secured to the outer ends of said taper pins and adjustable toward and away from one of said rims.

4. A traction cleat for vehicle wheels comprising a hollow rectangular metallic body open on one face, a resilient block secured in said body and projecting through said open face, said block and body being provided with registering openings to receive a cylindrical member, an outwardly projecting portion provided on the face of said body opposite the open face, said portion being provided with a relatively sharp edge, and perforated lug means provided on one side of said body.

5. A traction cleat for vehicle wheels comprising a hollow box-like body open on one face, a resilient block secured in said body and projecting through said open face to form a flexible pad, said block and body being provided with registering openings arranged eccentrically of the cleat for the reception of a cylindrical member, an outwardly projecting sharp edge portion formed on the face of said body opposite said open face, and perforated lug means provided on the opposite side of said body from said eccentrically arranged perforations.

6. A traction wheel for vehicles comprising spaced rim members, circumferentially spaced bars extending between said rim members, traction cleats including a hollow box-like body having one open face, a block of rubber secured in said body and projecting through said open face, said block and said body being provided with eccentrically arranged registering openings, cylindrical sleeve members positioned in said openings and secured to said rim members midway between adjacent bars, an outwardly projecting sharpened edge provided on said body on the face opposite said open face, lug means projecting from said body on the side opposite said eccentrically positioned openings, said lug means engaging said bars, and means for retaining said lugs in engagement with said bars.

7. A traction wheel for vehicles comprising a pair of spaced rim members, traction cleats provided with a projection on one side positioned between said rim members, circumferentially spaced pivots extending between said rims and pivotally supporting said cleats, and a bar permanently uniting said rims substantially midway between said pivots, said bars being disposed closer to the pivotal center of said wheel than the pivots for said cleats and limiting the pivotal movement of the cleats through engagement with the projections thereon.

8. A traction cleat for vehicle wheels comprising a hollow metallic body having one open face, a resilient block secured in said body and projecting through said open face, pivot means projecting from the opposite ends of said body and forming an axis about which said body rotates, an outwardly projecting sharp edge formed on the face of said body opposite said open face, and lug means projecting from one side face of said body, a plane bisecting said lug means being parallel to and coinciding with the axis of rotation of said cleat.

9. A reversible traction cleat for vehicle wheels comprising an elongated hollow metallic body having one open face, a resilient block secured in said body and projecting through said open face, an outwardly projecting sharp edge formed on the face of said body opposite said open face, and lug means projecting from one side face of said body, a plane bisecting said lug means being parallel to and coinciding with the longitudinal axis of said cleat.

PAUL CHAFFIN.